(12) United States Patent
Faith et al.

(10) Patent No.: US 9,348,896 B2
(45) Date of Patent: May 24, 2016

(54) DYNAMIC NETWORK ANALYTICS SYSTEM

(71) Applicants: Patrick Faith, Pleasanton, CA (US); Kevin P. Siegel, Danville, CA (US); Theodore Harris, San Francisco, CA (US); Craig O'Connell, San Mateo, CA (US)

(72) Inventors: Patrick Faith, Pleasanton, CA (US); Kevin P. Siegel, Danville, CA (US); Theodore Harris, San Francisco, CA (US); Craig O'Connell, San Mateo, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 450 days.

(21) Appl. No.: 13/706,226

(22) Filed: Dec. 5, 2012

(65) Prior Publication Data

US 2013/0144888 A1    Jun. 6, 2013

Related U.S. Application Data

(60) Provisional application No. 61/566,969, filed on Dec. 5, 2011.

(51) Int. Cl.
*G06F 17/30* (2006.01)
*G06Q 20/40* (2012.01)

(52) U.S. Cl.
CPC .......... *G06F 17/30696* (2013.01); *G06Q 20/40* (2013.01); *G06Q 20/4016* (2013.01)

(58) Field of Classification Search
CPC ................................................ G06F 17/30696
USPC ........................................................ 707/748
See application file for complete search history.

(56) References Cited

U.S. PATENT DOCUMENTS

| 7,251,624 | B1 | 7/2007 | Lee et al. |
| 7,699,221 | B2 | 4/2010 | Dragt et al. |
| 7,970,701 | B2 | 6/2011 | Lewis et al. |
| 8,244,629 | B2 | 8/2012 | Lewis et al. |
| 8,453,226 | B2 | 5/2013 | Hammad |
| 2006/0064374 | A1 | 3/2006 | Helsper et al. |
| 2006/0282660 | A1 | 12/2006 | Varghese et al. |
| 2008/0086342 | A1 | 4/2008 | Curry et al. |
| 2008/0140576 | A1* | 6/2008 | Lewis et al. ..................... 705/67 |
| 2009/0313134 | A1 | 12/2009 | Faith et al. |
| 2010/0280950 | A1 | 11/2010 | Faith et al. |

(Continued)

OTHER PUBLICATIONS

PCT/US2012/068032, "International Search Report and Written Opinion", Mar. 29, 2013, 10 pages.

(Continued)

*Primary Examiner* — Joshua Bullock
(74) *Attorney, Agent, or Firm* — Kilpatrick Townsend & Stockton LLP

(57) ABSTRACT

Embodiments of the invention is directed to a dynamic network analytics system capable of receiving and analyzing queries sent in data messages from data requesters. The queries contain a request from the data requester as to a risk level associated with an interaction conducted by a user. The dynamic network analytics system can determine an optimized process for determining the risk level of the interaction, based on an analysis of past interactions by the user and past interactions by users similar to the user. The dynamic network analytics system can retrieve data from internal and external data sources to generate a response to the query. The dynamic network analytics system conducts the optimized process and uses the retrieved data to generate risk assessments and risk scores in response to the query from the data requester.

21 Claims, 12 Drawing Sheets

(56) References Cited

U.S. PATENT DOCUMENTS

| | | |
|---|---|---|
| 2011/0066551 A1 | 3/2011 | Bruesewitz et al. |
| 2011/0137789 A1 | 6/2011 | Kortina et al. |
| 2011/0184838 A1 | 7/2011 | Winters et al. |
| 2011/0238578 A1 | 9/2011 | Hurry |
| 2013/0144785 A1 | 6/2013 | Karpenko et al. |

OTHER PUBLICATIONS

U.S. Appl. No. 13/434,818, filed Mar. 29, 2012 for Hammad et al.

* cited by examiner

MerchantABC!

Sign In
What is your e-mail address?

My e-mail address is: [          ]

Do you have a MerchantABC.com password?

○ I am a new customer.

⦿ I am a returning customer, and my password is: [          ]

☐ Keep me signed in.

( Sign in using our secure server )
Forgot your password?

MerchantABC!

Your Account > Your Orders > Order Summary #123-4567890 > Change Shipping Address Add a U.S. address Click the Continue button when done.

Full name: _____
Address Line 1: _____
Address Line 2: _____
City: _____
State/Province/Region: _____
ZIP: _____
Country: United States ▾
Phone Number: _____

MerchantABC!

Review Your Order

Shipping Address:
User
123 Main St.
San Francisco, CA 94111
United States
Phone: 5551234567  Change Payment Information:
ending in 5551  Change Billing Address:
Same as shipping address  Change Gift Cards & Promotional Codes:
[    ] Apply Place your order

Order Summary

Items: $599.00
Shipping & Handling: $6.49

Total before tax: $605.49
Estimated tax to be collected: $51.47

Order Total: $656.96

Estimated delivery: Dec. 6, 2012

XYZ Raptor Xti 18 MP Digital Camera
55mm f/3.5-5.6 IS Lens
$599.00
Quantity: 1  Change Add gift options Choose a shipping speed:
⦿ Standard Shipping (3-5 business days)
○ Two-Day Shipping
○ One-Day Shipping

DYNAMIC NETWORK ANALYTICS SYSTEM

CROSS-REFERENCES TO RELATED APPLICATIONS

This application is a non-provisional application of and claims the benefit of priority of U.S. Provisional Application No. 61/566,969, filed on Dec. 5, 2011, which is herein incorporated by reference in its entirety for all purposes.

BACKGROUND

Fraud is a potential risk for merchants and other entities that provide services or interact with consumers. As consumers increasingly interact with merchant systems using portable computing devices (e.g., desktop computers, laptop computer, tablet computer, mobile phones, etc.) over networks, including the internet, the risks to merchants have also increased. Correspondingly, the need for methods and systems of evaluating the risk of consumer interactions with a merchants system has increased. However, it may be difficult for a merchant to discern which interactions legitimate consumers are conducting and which interactions individuals attempting to conduct fraudulent activity are conducting. Thus, being able to determine whether there are risks associated with certain interactions can be important for a merchant.

For example, the merchant may want information to assist in determining whether an interaction should be allowed, such as a change to an email address, change to a shipping address, or a purchase checkout for a transaction. In other scenarios, the merchant may simply want information as to the riskiness of a user browsing items on the merchant's website or attempting to access specific content.

Currently, in order to generate a risk evaluation or assessment for an interaction, data is aggregated from multiple sources and combined to determine a single risk assessment based on the totality of data accessible. A significant drawback of this method is that significant and sometimes unnecessary financial, system, and network resources may be required to gather and aggregate all of the data available. In addition, being able to detect or determine that the current interaction is risky may not be sufficient if fraudulent activity is conducted progressively through multiple interactions. Some interactions may not involve conducting a financial transaction, but may nonetheless, be carried out by a user attempting to conduct fraudulent activity.

Thus, new and enhanced methods of optimizing risk evaluations have become necessary to more efficiently utilize and conserve financial resources and network resources, while providing a dynamic and reliable risk assessment.

Embodiments of the invention address the above problems, and other problems, individually and collectively.

BRIEF SUMMARY

Embodiments of the present invention are related to systems and methods for evaluating a query from a data requester, determining a process for generating a response, and generating a response to the query based on an analysis of internal risk data and external data sources. Embodiments are further related to querying external data sources to retrieve information to generate the response to the query, where the external data sources are queried in an iterative manner.

One embodiment of the invention is directed to a method comprising receiving, at a data analyzer module, a first data message including a query from a data requester. The method may further comprise determining a current risk level associated with the query, receiving risk data relevant to the query from one or more fixed risk data tables and one or more dynamic risk data tables, and receiving external data relevant to the query from a first external data source. The method may further comprise determining whether there is sufficient data to form a response to the query or one or more cut-off values have been reached, wherein if there is insufficient data or one or more cut-off values have not been reached, retrieving external data relevant to the query from a second external data source until there is sufficient data to form a response to the query or one or more cut-off values have been reached. The method may further comprise generating a second data message containing the response to the query, and providing the second data message to the data requester.

Another embodiment of the invention is directed to a method comprising receiving a first data message including a query from a data requester, and parsing the query to determine current interaction data for an interaction conducted by the consumer with the data requester system. The method may further comprise retrieving stored consumer data, wherein the stored consumer data comprises past interaction data by the consumer with the data requester system, retrieving stored similar consumers data, wherein the stored similar consumers data comprises risk levels for the interaction for similar consumers to the consumer, and retrieving stored external sources data. A current risk level associated with the interaction conducted by the consumer with the data requester system may be determined based on the stored consumer data, the stored similar consumers data, and the stored external sources data. The method may further comprise determining a process for querying a plurality of external data sources.

Another embodiment of the invention is directed to a method comprising receiving a request for an estimate of risk concerning a consumer, determining a first risk level estimate concerning the consumer using a first set of data, determining a first value representing a confidence in the first risk level estimate, and ascertaining a cost of acquiring a second set of data for determining another risk estimate concerning the consumer. The method may further comprise automatically weighing, using at least one processor operatively coupled with a memory, the first value representing a confidence against the cost of acquiring the second set of data, and automatically acquiring the second set of data based on the automatic weighing. The method may further comprise updating the first risk level estimate to a second risk level estimate concerning the consumer using the automatically acquired second set of data, and sending a response to the request.

Another embodiment of the invention is directed to a method comprising providing a website having a product page and a shopping checkout page, determining that a consumer is viewing the product page, and determining a first risk level estimate concerning the consumer when the consumer is viewing the product page. The method may further comprise determining that the consumer is viewing the shopping checkout page, updating the first risk level estimate to a second risk level estimate concerning the consumer when the consumer is viewing the shopping checkout page, receiving an indication to start a purchase transaction from the consumer on the shopping checkout page, and assessing a risk of the purchase transaction using the second risk level estimate that was updated from the first risk level estimate.

These and other embodiments of the invention are described in further detail below with reference to the Figures and the Detailed Description.

BRIEF DESCRIPTION OF THE DRAWINGS

FIG. 7 shows a screen shot of an exemplary user login page according to an embodiment of the invention.

FIG. 8 shows a screen shot of an exemplary change shipping address page according to an embodiment of the invention.

FIG. 10 shows a screen shot of an exemplary order checkout page according to an embodiment of the invention.

DETAILED DESCRIPTION

Figure 1:
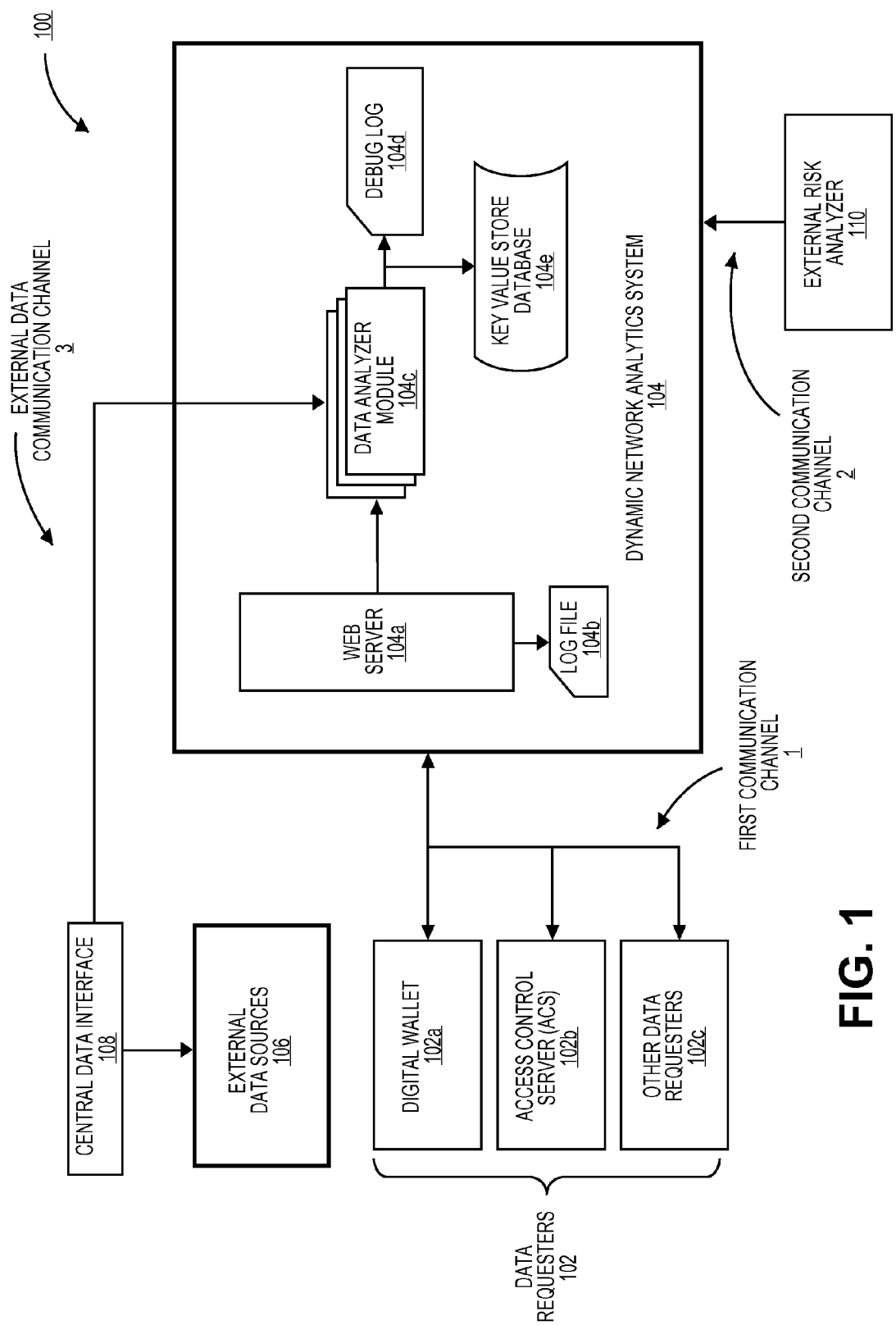
FIG. 1 shows a block diagram of a system according to an embodiment of the invention.

Prior to discussing embodiments of the invention, descriptions of some terms may be helpful in understanding embodiments of the invention.

The term "data analyzer module" may refer to a component for a risk evaluation system. In some embodiments, the data analyzer module electronically receives data messages from data requesters, and attempts to answer a query contained in the data message. In some embodiments, the data analyzer module may be able to make risk assessments regarding interactions and transactions by evaluating past transaction data and past interaction data. In order to answer the query contained in the data message, the data analyzer module may access fixed risk data tables and dynamic risk data tables, as well as query one or more of a plurality of external data sources.

The term "data message" may refer to a message sent as part of a process of determining the risk of an interaction with a merchant system. In some embodiments, the data message is an HTML post message sent by the data requester to the dynamic network analytics system containing a query. The data message may also refer to an HTML post message sent from the dynamic network analytics system to the data requester containing a response to the query requested by the data requester. In other embodiments, the data messages between the data requester and the dynamic network analytics system may be sent via SMS, USSD-2, or by any other appropriate messaging and communications means.

In some embodiments, the data message may be a first data message including a query from a data requester. The first data message may include device data, consumer data, interaction data, and transaction data, as part of the query sent from the data requester to the dynamic network analytics system. The data message may also be a second data message containing the response to the query. The second data message may be a message that is sent from the dynamic network analytics system to the data requester. The second data message may include a response to the query, in the form of a risk assessment and/or a risk score.

The term "data requester" may refer to a system or entity that seeks information regarding the risk of an interaction with its system. Examples of data requesters may include a digital wallet, an access control server (ACS), and other systems or entities that may require information as to the authenticity of a user accessing their system. Additional examples of data requesters may include parties that participate in financial transactions and would need information in order to determine whether to approve or deny a financial transaction (e.g. Cybersource Decision Manager, Verified by Visa, and Visa Access Control Server). In other embodiments, data requesters may also include systems or entities that provide incentives to consumers, such as coupons, deals, or rebates.

The term "risk data" may refer to data that may be used to determine risk. Risk data may be used to conduct a risk evaluation for an interaction by a user with a merchant system, or may be used to determine a risk assessment of a user attempting to conduct a financial transaction with a merchant. Risk data may include data indicating high-risk accounts, devices, physical address, and IP addresses. In some embodiments, the dynamic network analytics system analyzes a query with risk data contained in fixed risk data tables and dynamic risk data tables, in order to respond to query from a data requester as to the risk associated with a user interaction.

The term "fixed risk data tables" may refer to data tables used to conduct a risk evaluation. In embodiments, the fixed risk data tables include risk data that is created externally from the dynamic network analytics system and transmitted to the system on a daily basis. In other embodiments, the fixed risk data tables may include risk data that is transmitted and updated more or less regularly. The fixed risk data tables may include fraud reports, and lists of accounts, devices, physical addresses, and IP addresses. These lists may indicate accounts, devices, physical addresses, and IP addresses that have been determined to be of higher risk. In other embodiments, the fixed risk data tables may include lists of accounts, devices, physical addresses, and IP addresses that have been determined to be of lower risk or safe from fraudulent activity. The fixed risk data tables may be provided by an external risk analyzer to the dynamic network analytics system. Examples of external risk analyzers that may provide the data for the fixed risk data tables are banks or other financial institutions.

The term "dynamic risk data tables" may refer to data tables used to conduct a risk evaluation. In embodiments, the dynamic risk data tables include risk data that is created externally from the dynamic network analytics system and accessible by the dynamic network analytics system. In some embodiments, the dynamic risk data tables are continuously updated such that they contain real-time risk data. In other embodiments, the dynamic risk data tables are updated every millisecond, every five seconds, or continuously as data is received.

The term "external data sources" may refer to a generally to an entity or system that provides data. An external data source may be a source of data that is external to a system. In some embodiments, an external data source may be located physically external from the system (e.g., in a separate physical location or separate computer), or may be located in a distinct location within a physical memory component within the system. In other embodiments, an external data source may refer to a source within the system that requires additional authentication processes or credentials to access. An external data source may be a source outside of a system firewall or located outside of a network of a company, system or entity.

In some embodiments, the external data sources may include third party vendors that gather, analyze, and provide risk assessment data. In some embodiments, these third party vendors provide the risk assessment data for a fee. External data sources may also include sources, either internal or external to a system, which charge a fee for the retrieval and provision of data.

The term "sufficient data" may refer to an amount of data. In some embodiments, the dynamic network analytics system queries the fixed risk data tables, the dynamic risk data tables, and the external data sources in order to generate a response to the query. In some embodiments, the dynamic network analytics system queries the sources until it determines that a sufficient amount of data has been gathered to generate a response. In some embodiments, the dynamic network analytics system determines it has sufficient data when an accuracy-based cut-off value is satisfied. When an accuracy-based cut-off value is met, it is an indication to the dynamic network analytics system that the data analyzer module has retrieved enough data from the data tables and external data sources to generate a response to the query. In some embodiments, determining whether there is sufficient data to form the response to the query is based on a balancing of the current risk level, the cost of querying each of the plurality of external data sources, and the time to query each of the plurality of external data sources.

In some embodiments, sufficient data may also refer to a quality of data. In some embodiments, a sufficiency or accuracy score may be used to determine the sufficiency of data retrieved by the data analyzer module. For example, the dynamic network analytics system may determine that for a user login interaction, that once a sufficiency score of 75% is reached, further querying of external data sources are not required and the system can generate a response to the query. In another example, dynamic network analytics system may determine that for a purchase checkout interaction, that external data sources must be queried until a sufficiency score of 95% is reached. These sufficiency scores may be different for each type of transaction, different for each specific user, and/or different for each merchant. The sufficiency score may be determined based on one or more of a reliability score for an external data source, an amount of data retrieved, number of external data sources queried, etc.

The term "cut-off values" may refer to values that may establish a threshold. The cut-off values are determined based on determining the process for querying a plurality of external data sources. Based off the determined process, if a risk level is high, the cut-off values may be correspondingly high. If the risk level is low, the cut-off values may be low. In some embodiments, the cut-off values may be time-based, cost-based or accuracy-based. A time-based cut-off value may be based on the length of time the data requester or the dynamic network analytics system determines to be used to perform the risk evaluation. A cost-based cut-off value may be based on the amount of financial resources the data requester or the dynamic network analytics system determines to be used to perform the risk evaluation. An accuracy-based cut-off value may be based on what risk score the data requester of the dynamic network analytics system determines should be achieved before the system should stop retrieving data. For example, if evaluation of data by the dynamic network analytics system achieves a risk score within 10% of an acceptable risk score, the system may stop querying external data sources, whereas if the risk score is not within 10% of the acceptable risk score, the system may continue querying external data sources.

The term "response to the query" may refer to a response message sent as part of a risk evaluation. In some embodiments, once the dynamic network analytics system has evaluated the query with the fixed risk data tables, the dynamic risk tables, and one or more external data sources, the system generates a response to the query. The response to the query may include a risk assessment based on the query and/or a risk score associated with the query. In some embodiments, the response to the query is generated when there is sufficient data to generate a response or a cut-off value has been met.

For example, a query may contain a request as to the risk associated with a user modifying a shipping address for a user account. The dynamic network analytics system may determine that the risk level is low based on a multitude of data from the fixed risk data tables, the dynamic risk tables, and one or more external data sources, and may assign the query a low risk score. The dynamic network analytics system may then generate a response to the query containing its analysis of the query and the risk score. The response to the query is then transmitted back to the data requester.

The term "device data" may refer to data that may be used to conduct a risk evaluation. Device data may refer to data regarding a portable computing device, such as a computer or mobile phone. Examples of device data may include unique identifiers for a computer or mobile phone, an IP address, SIM card data, and device make and model data. Device data may also include the device's MSISDN, or Mobile Subscriber Integrated Services Digital Network-Number, which is a number that uniquely identifies a subscription in a mobile network.

In some embodiments, the device data for a specific device may be used to retrieve past interactions conducted using the specific device, which may be used to determine the risk associated with the specific device. For example, if the specific device previously was flagged for fraudulent activity, the risk level associated with the specific device may be higher. If the specific device has no history of fraudulent activity, the risk level associated with the specific device may be lower.

The term "consumer data" may refer to data that may be used to conduct a risk evaluation. Consumer data may refer to data regarding a user or consumer. Consumer data may include the name, mailing address, shipping address, phone number, payment account number, date of birth, marital status, income, social security number, demographic data, etc. In some embodiments, consumer data may also include consumer preferences, notification methods, and prior transaction history. In some embodiments, consumer data may be stored in a log file in the dynamic network analytics system. The stored consumer data may be used as part of the risk analysis.

The term "interaction" may refer to an action conducted by a user or consumer. In some embodiments, the user or consumer conducts interactions with a merchant system, such as a merchant website. Typical interactions with a merchant system may include, but are not limited to, connecting to the merchant website, presenting authentication data to log into an account with the merchant website, modifying account settings on the merchant website, requesting authentication data, viewing products on the merchant website, and conducting a financial transaction. The interactions are typically conducted using a computing device (e.g., desktop computer, laptop computer, tablet computer, internet-capable mobile phone, etc.) that is capable of connecting to the merchant system.

The term "interaction data" may refer to data that may be used to conduct a risk evaluation. Interaction data may include data on the type of interaction being conducted by the user. Interaction data may also include length of interaction, time of day of interaction, etc. The interaction data may be used as part of the risk evaluation as different interactions may have different levels of risk associated with them. For example, the risk of a user connecting with a merchant website may be considered an interaction involving lower risk than the user attempting to complete a financial transaction. In some embodiments, the interaction data may be used to establish an initial risk assessment prior to the dynamic network analytics system retrieving and analyzing stored and retrieved data. In some embodiments, interaction data may be stored in a log file in the dynamic network analytics system. The stored interaction data may be used as part of the risk analysis to determine past interaction history associated with a user or device.

The term "transaction data" may refer to data that may be used to conduct a risk evaluation. Transaction data may include data for a specific transaction, including items purchased, item prices, total cost, shipping address, payment methods, authentication data, merchant data, etc. In some embodiments, transaction data may only be generated once the user or consumer attempts to submit a transaction for processing. In other embodiments, transaction data may be generated and sent by the merchant system based on items added to a consumer's shopping cart. In some embodiments, transaction data may be stored in a log file in the dynamic network analytics system. The stored transaction data may be used as part of the risk analysis to determine past transaction history associated with a user or device.

For example, the dynamic network analytics system may evaluate external data sources in determining which external data sources to query and which external data sources should be queried with a higher priority. If a query is one that requires a quicker response and/or has a lower risk level, the dynamic network analytics system may choose to query external data sources that are less costly and/or provide a faster response, whereas if the query is one that does not require a quick response and/or has a higher risk level, the dynamic network analytics system may choose to query external data sources that may be more costly and/or take additional time to query slower external data sources if they are more reliable.

The term "cost of querying" and "cost of acquiring" may refer to a monetary amount required for carrying out an action. In some embodiments, the dynamic network analytics system retrieves data from external data sources. These external data sources may include third party vendors that conduct risk assessments. In some embodiments, the external data sources may each have an associated cost for providing its risk assessment, where each external data source may have a different cost. The costs associated with each of the plurality of external sources may be a factor used by the dynamic network analytics system in determining which external data sources from which to retrieve external data. In some embodiments, the cost of querying each of the plurality of external data sources may be stored in a data table accessible from the log file.

For example, if the cost of retrieving external data from external data source A is higher than the cost of retrieving external data from external data sources B and C, the dynamic network analytics system may choose to retrieve external data from external data sources B and C. The cost of querying each of the plurality of external data sources may be weighed with other factors in making this determination.

In other embodiments, the "cost of querying" may refer to the complexity of performing a search in terms of the execution and processes required to conduct a search or retrieve data. In other embodiments, the "cost of querying" may also be a length of time that is required to conduct a search or retrieve data.

The term "time to query" may refer to a length of time used or required for an action to occur or be carried out. In some embodiments, the dynamic network analytics system retrieves data from external data sources. In some embodiments, the external data sources may each have an associated length of time required for providing its risk data, where each external data source may have a different time to query. For example, one external data source may take twice as long as a second external data source, which can be a factor used by the dynamic network analytics system in determining which external data sources to retrieve external data from. The time to query each of the plurality of external data sources may be weighed with other factors in making this determination. In some embodiments, the time to query each of the plurality of external data sources may be stored in a data table accessible from the log file.

The term "external sources data" may refer to data regarding the external data sources that is used to conduct a risk evaluation. External sources data may include data regarding each of the plurality of external data sources. The external sources data may be used as factors in determining the process for querying a plurality of external data sources. In some embodiments, the external sources data is stored in a log file in the dynamic network analytics system. In other embodiments, the dynamic network analytics system may retrieve the external sources data when a query is received from a data requester.

Examples of "external sources data" may include the cost of querying an external data sources, including the financial cost and the network resources cost, and the time required to query and receive a response from each of the plurality of external data sources. Additional examples of "external sources data" may include the reliability of an external data source, which may be expressed as a reliability score based on previous performance by the external data source.

The term "interaction history" may refer to a history of previous interactions. In some embodiments, the previous interactions conducted by a user are stored in a log file in the dynamic network analytics system. The interaction history of a specific user or consumer can be used as part of a risk analysis for a current interaction by the specific user or consumer. In other embodiments, the interaction history of similar consumers can be used as part of a risk analysis for a current interaction. For example, a user may have previously logged onto a merchant's website to modify a shipping address associated with a particular user account. Viewed as a single interaction between the user and the merchant system, a modification to the shipping address may have a low level of risk associated with it. However, by retrieving and analyzing the interaction history for the user, a changed shipping address in the first interaction, followed by a second interaction later in time for the purchase of an expensive item may be indicative of fraudulent activity and/or may increase the risk level associated with the interaction.

The term "consumer" may refer to an individual or entity. The consumer may be associated with a financial account and with a user account with a merchant system. The consumer's financial account can be used to conduct financial transactions with the merchant system. In some embodiments, the consumer conducts non-transaction related interactions with the merchant system. The consumer may also be an individual attempting to conduct fraudulent activity by interacting with a merchant system using fraudulent or stolen authentication data. The term "user" may be used interchangeable with "consumer."

The term "similar consumers data" may refer to data of similar consumers that is used as part of a risk evaluation. In some embodiments, the similar consumers data is stored in and accessed from a log file in the dynamic network analytics system. The similar consumers data may be retrieved from the log file based on an analysis of a query contained in a data message from a data requester. The similar consumers data may be updated after each risk assessment conducted by the dynamic network analytics system and stored in the log file.

For example, if the query asks the risk of a user modifying an email address associated with a user account, the dynamic network analytics system may retrieve data from the log file of previous interactions from similar consumers. The determination of similar consumers may be based on transaction data, consumer data, device data, and interaction data contained in the data message. Once the similar consumers are determined, the past interactions and history of similar consumers may be analyzed. If the dynamic network analytics system determines that in view of similar consumers, modifying the email address associated with a user account does not present a high risk of being fraudulent, it may determine that there is a low risk in the current instance of the user modifying the email address.

The term "current risk level" may refer to a risk level associated with a particular interaction or action. The current risk level may be a determination made based on stored consumer data, stored similar consumers data, and stored external sources data. The current risk level may be a risk level for the specific interaction contained in the query received from the data requester. In some embodiments, the current risk level is based off data stored in the dynamic network analytics system based off previous interactions and transactions. In these embodiments, the current risk level may be a baseline risk level that is then used to determine a process for querying a plurality of external data sources.

The term "process for querying" may refer to a process that is part of a risk evaluation. In some embodiments, the dynamic network analytics system determines a process for querying external data sources using an economics-based model factoring the cost of each external data source, time to receive data from each external data source, and the current risk level associated with the type of interaction. For example, if the current risk level is determined to be high, the dynamic network analytics system may determine that the process for querying a plurality of external data sources should be more robust (e.g., query additional external data sources and/or query more expensive external data sources that conduct more detailed analyses). On the other hand, if the current risk level is determined to be low, the dynamic network analytics system may determine that the process for querying a plurality of external data sources should be less substantial (e.g., query less expensive and/or fewer external data sources).

The term "selection" may refer to a subgroup of a larger group. In some embodiments, the system determines a selection of external data sources that are queried as part of a risk evaluation. In some embodiments, determining a selection of the plurality of external data sources is based on determining the process for querying a plurality of external data sources. For example, when the dynamic network analytics system determines the process for querying a plurality of external data sources, it may determine, based on the risk level, that some external data sources should be favored over others. For example, cheaper and faster external data sources may be favored over expensive and slower external data sources in some instances. Thus, the selection of the plurality of external data sources may be an ordered prioritized list of external data sources based on the risk level. The external data sources may then be queried iteratively, one at a time, in the order based on the selection of the plurality of external data sources, until the response to the query can be generated.

The term "automatically" may refer to an action that can be conducted without direct human interaction. In some embodiments, the dynamic network analytics system may automatically weigh a confidence value against the cost of acquiring additional data. In these embodiments, the system can determine, without the need for interaction by a human, whether there is sufficient data or a confidence value has been reached. If it determinations that there is insufficient data or a confidence value not have been reached, the system may query additional resources to obtain additional data without additional prompting.

The term "weighing" may refer to a process of evaluating data. In some embodiments, the dynamic network analytics system, in determining a process of querying the external data sources, may consider various factors, including the current risk score, the external sources data, previous transaction and interactions. The system can automatically weigh these factors in order to determine the process for querying. In some embodiments, weighing may also refer to the process of determining whether the system has retrieved a sufficient amount of data to generate a response against the cost of querying additional data sources for additional data (e.g., financial costs, resources, time, etc.).

The term "reliability score" may refer to value indicating the reliability of an external data source. In some embodiments, the dynamic network analytics system queries and receives data from a plurality of external data sources, which may include third party vendors, entities or sources. The dynamic network analytics system or another party may assign a reliability score to each of the external data sources indicating the strength, dependability or reliability of the data and/or analysis provided by each of the external data sources. In some embodiments, the reliability score can be a factor in determining the process of querying the plurality of external data sources. For example, more reliable external data sources may be preferred over less reliable data sources. The reliability score may be included in the external sources data to indicate how reliable the data from the particular external data source is.

The term "estimate of risk" may refer to a result from an analysis. The "estimate of risk" may also refer to the "risk assessment" or "risk score". In some embodiments, the estimate of risk may be the response requested by a data requester. For example, when the data requester detects an interaction from a user, generates a query in a data message, and sends the data message to the dynamic network analytics system, the data requester is seeking an estimate of risk for the interaction by the user. The estimate of risk may be provided in the form of a risk assessment or a numerical value, such as a risk score, indicating the level of risk determined to be associated with the interaction.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

I. Systems

Figure 2A:
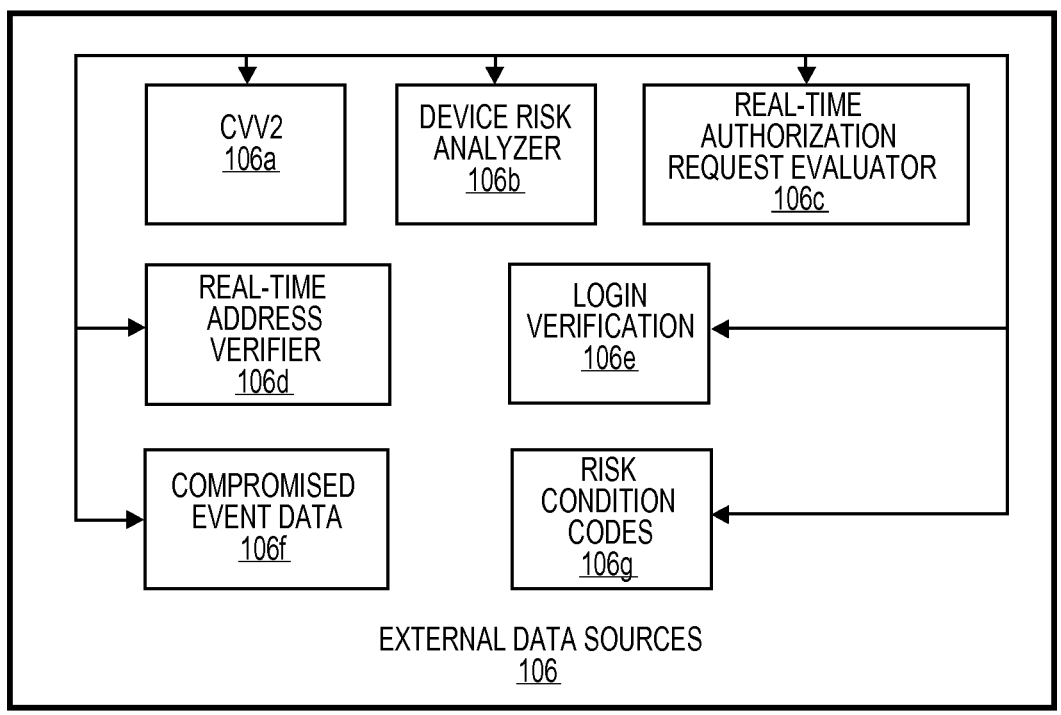
FIG. 2A shows a block diagram of external data sources according to an embodiment of the invention.
Figure 2B:
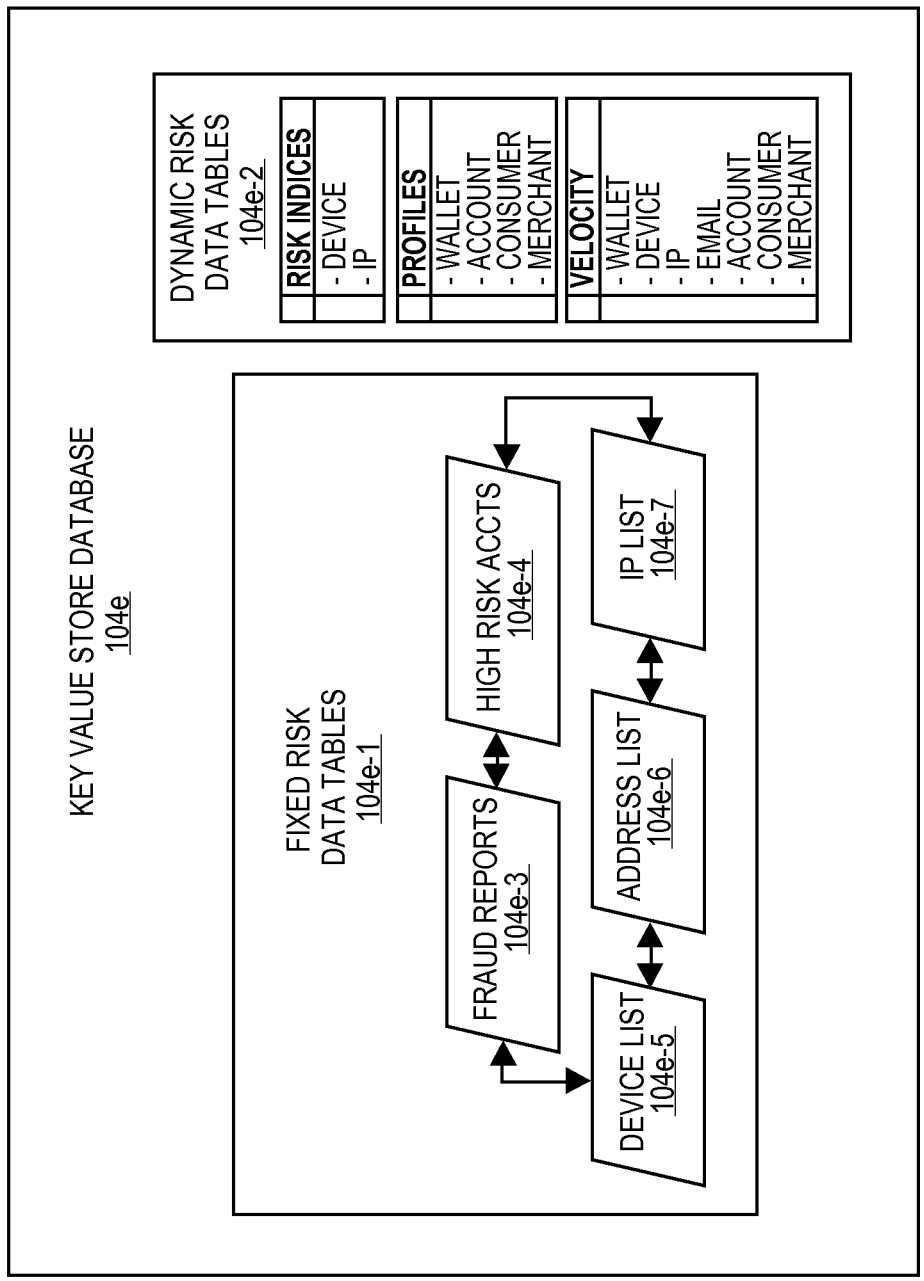
FIG. 2B shows a block diagram of a key value store database according to an embodiment of the invention.

A system 100 for receiving queries from data requesters and generating responses to the queries according to an embodiment of the present invention is shown with reference to FIGS. 1, 2A, and 2B.

The system 100 is comprised of a plurality of data requesters 102 that can communicate with a dynamic network analytics system 104. The dynamic network analytics system 104 comprises a plurality of modules and components that can communicate with a plurality of external data sources 106 through a central data interface module 108, and can communicate with an external risk analyzer 110. For simplicity of illustration, a certain number of components are shown in FIG. 1. It is understood, however, that embodiments of the invention may include more than one of each component. In addition, some embodiments of the invention may include fewer than all of the components shown in FIG. 1. In addition, the components in FIG. 1 may communicate via any suitable communications medium (including the Internet), using any suitable communications protocol. Additional details and components are described below with respect to FIGS. 2A and 2B.

The system 100 may also include a first communication channel 1, a second communication channel 2, and an external data communication channel 3.

The plurality of data requesters 102 may be in any suitable form. Examples of data requesters may include a digital wallet 102a, an access control server (ACS) 102b, and other data requesters 102c.

A digital wallet 102a allows a consumer to conduct electronic commerce transactions. In some embodiments, the digital wallet may hold financial account data and authentication data. The digital wallet data may reside in the portable computing device (e.g., computer or mobile phone), or on the servers of a digital wallet service. When stored in the portable computing device, the wallet may use a digital certificate that identifies the authorized account holder.

An access control server (ACS) 102b is a server computer that has a database of account holders registered for account authentication services. The ACS 102b may contain account and password information for each account holder. In some embodiments, during a financial transaction, the ACS 102b receives authentication request messages from merchants, provides digitally signed receipts to the merchants in authentication response messages, controls access to account authentication services, and validates account holder participation in the account authentication services. In some embodiments, the ACS 102b may be operated by the account issuer. In other embodiments, a service organization, such as Visa, may operate the ACS 102b on behalf of the account issuer. In some embodiments, while the account authentication services do not require any additional account holder software to be used, optional account holder software and hardware may be deployed.

Other data requesters 102c may include, but are not limited to, systems or entities that participate in financial transactions, systems or entities that may need information in order to approve or deny a financial transaction (e.g. Cybersource Decision Manager, Verified by Visa, and Visa Access Control Server), and systems or entities that require fraud and risk data. In other embodiments, other data requesters 102c may also include systems and entities that provide incentives to consumers, such as coupons, deals, or rebates. In other embodiments, other data requesters 102c may also include systems or entities that conduct authentication services.

The dynamic network analytics system 104 may include a web server 104a, a log file module 104b, a data analyzer module 104c, a debug log module 104d, and a key value store database 104e. The various modules may be embodied by computer code, residing on computer readable media.

The web server 104a electronically receives data messages that are transmitted from the data requesters 102 to the dynamic network analytics system 104. The data messages received by the web server 104a may contain a query from the data requesters requesting a risk assessment for an interaction. In some embodiments, the web server 104a receives the data message in the format of an HTML post data message. An exemplary web server 104a is an Apache Web Server, which is a public-domain open source web server. In embodiments of the invention, the web server 104a, after receiving the data message, conducts an evaluation and validation of the data message. In some embodiments, the web server 104a determines whether the message has a virus attached to it. When the web server 104a finds a virus, it may remove the virus and clean the data message. In some embodiments, the web server 104a can also determine whether the query contained in the message is a valid query that may be asked. Once the web server 104a has cleaned and validated the message, it is sent to the data analyzer module 104c for further processing.

In some embodiments, the data message transmitted through the first communication channel 1 from the data requesters 102. The data message may be comprised of an HTML post message, in an ASCII message format. The data message that is transmitted through the first communication channel 1 may be electronically received by the dynamic network analytics system 104.

The data analyzer module 104c electronically receives the message from the web server 104a, and attempts to answer the query contained in the message. In some embodiments, the data analyzer module 104c may be able to generate risk assessments regarding interactions and transactions by evaluating past transaction data and past interaction data. In order to answer the query contained in the data message, the data analyzer module may access fixed risk data tables 104e-1 and dynamic risk data tables 104e-2. The data analyzer module 104c may determine whether there is sufficient data to form a response to the query or one or more cut-off values have been reached. If there is insufficient data or one or more cut-off values have not been reached, the data analyzer module 104c may query one or more of a plurality of external data sources 106. The data analyzer module may query the one or more of a plurality of external data sources 106, one at a time, in an iterative process, until there is sufficient data to form a response to the query or one or more cut-off values have been reached.

In order to retrieve data to generate a response to the query from the data requester 102, the data analyzer module 104c may access the fixed risk data tables 104e-1 and the dynamic risk data tables 104e-2 that are stored in the key value store database 104e.

The key value store database 104e is a database containing the fixed risk data tables 104e-1 and the dynamic risk data tables 104e-2. The data analyzer module 104c may access the key value store database 104e and retrieve data from the fixed risk data tables 104e-1 and the dynamic risk data tables 104e-

2. The data contained in the fixed risk data tables 104e-1 and the dynamic risk data tables 104e-2 may be used to generate a response to the query.

The fixed risk data tables 104e-1 are composed of a plurality of risk tables that may include data on fraud reports provided by issuers 104e-3 (e.g. Visa TC-40 Fraud Reports), lists of high risk accounts 104e-4, high risk device lists 104e-5, high risk physical address lists 104e-6, and high risk internet protocol (IP) address lists 104e-7. In embodiments, the fixed risk data tables 104e-1 may include all of these tables, some of these tables, or additional tables. In some embodiments, the fixed risk data tables 104e-1 may include lists of low risk or safe accounts, devices, physical addresses, and IP addresses. The fixed risk data tables 104e-1 may be created and updated externally of the dynamic network analytics system 104, and are electronically sent to the system on a daily basis via the second communication channel 2. The data contained in the fixed risk data tables 104e-1 may be transmitted to the dynamic network analytics system 104 by the external risk analyzer 110 via the second communication channel 2. The data contained in the fixed risk data tables 104e-1 may be updated at a designated time. In some embodiments, the fixed risk data tables 104e-1 are updated at 24-hour intervals.

The dynamic risk data tables 104e-2 are composed of risk indices, profiles, and velocity data. The data contained in the dynamic risk data tables 104e-2 are updated more frequently than the data contained in the fixed risk data tables 104e-1.

The risk indices may include, but is not limited to, lists of devices and IP addresses that have a high risk of fraudulent activity or have a high rate of previous fraudulent activity.

The profiles may include, but is not limited to, lists of digital wallets, user accounts, financial accounts, consumer profiles, and merchant profiles. These profiles may be accessed to retrieve risk data associated with a given profile.

The velocity data may include, but is not limited to, transaction velocity data for specific digital wallets, devices, IP addresses, email address, user accounts, financial accounts, specific consumer and specific merchants. Additional velocity data may relate to physical addresses.

In some embodiments, the dynamic risk data tables 104e-2 are updated as frequently as every millisecond. The dynamic risk data tables 104e-2 may be updated in real-time by data transmitted to the dynamic network analytics system 104 by the external risk analyzer 110 via the second communication channel 2.

The log file module 104b may be used to store a record of every query received from a data requester 102. In some embodiments, the response to the query is also stored in the log file module 104b. In some embodiments, the log file module 104b store past interaction data, external sources data, and similar users data.

The debug log module 104d may be used to store the records of how the query was processed by the dynamic network analytics system 104 and how the dynamic network analytics system 104 performed. In some embodiments, the data in the debug log module 104d may be used to gauge system performance of the dynamic network analytics system 104.

As shown in FIG. 2A, the plurality of external data sources 106 that are inputted through the external data communication channel 3 may be comprised of one or more of, but are not limited to, the following data sources: card verification value (CVV or CVV2) verifier 106a, a device risk analyzer 106b (e.g. ThreatMetrix), a real-time authorization request evaluator 106c (e.g. Visa Advanced Authorization), a real-time address verifier 106d (e.g. Visa Address Verification Service), a login or identity verification service 106e (e.g. RSA), a compromised event data evaluator 106f (e.g. Compromise Event Reference ID), and risk condition codes 106g (e.g. Compromised Account Risk Condition Code).

Card verification value (CVV or CVV2) verifier 106a may compare a user-inputted security code located on the back of a payment device against the issuer's database to ensure that the user attempting to conduct a transaction utilizing the payment device is in actual physical possession of the payment device.

The device risk analyzer 106b may conduct a real-time evaluation of past transactions involving the device to assess the risk in a web transaction.

The real-time authorization request evaluator 106c may evaluate the authorization request data in real time, and assesses and assigns a risk score or value.

The real-time address verifier 106d checks a cardholder's billing address and/or postal code against the card issuer's records in real-time to verify that the user conducting the transaction possesses the card.

The login or identity verification service 106e determines whether a user accessing an account by logging in, is actually an authorized user by seeking user authentication data.

The compromised event data 106f provides compromised data sets that may contain data on the most recent compromised or test sites that an account number was tied to.

The risk condition codes 106g may provide descriptive information about high-risk events detected across multiple accounts and a payment system and enable real-time decisions, making it possible to stop potential losses before the transaction is completed.

The plurality of external data sources 106 may be accessed by the data analyzer module 104c in the dynamic network analytics system 104 through the central data interface module 108 via the external data communication channel 3.

Returning to FIG. 1, the external risk analyzer 110 may be an entity that evaluates previous transactions and creates the fixed risk data tables 104e-1 and dynamic risk data tables 104e-2. These risk data tables may be electronically sent to the dynamic network analytics system 104 from the external risk analyzer 110 via the second communication channel 2. In some embodiments, the fixed risk data tables 104e-1 electronically sent by the external risk analyzer 110 are updated and sent to the dynamic network analytics system 104 on daily basis. In some embodiments, the dynamic risk data tables 104e-2 electronically sent by the external risk analyzer 110 are updated and sent to the dynamic network analytics system 104 on continuous basis and may be updated in real-time.

II. Methods

Methods according to embodiments of the invention can be described with respect to FIGS. 1-6.

Figure 3:
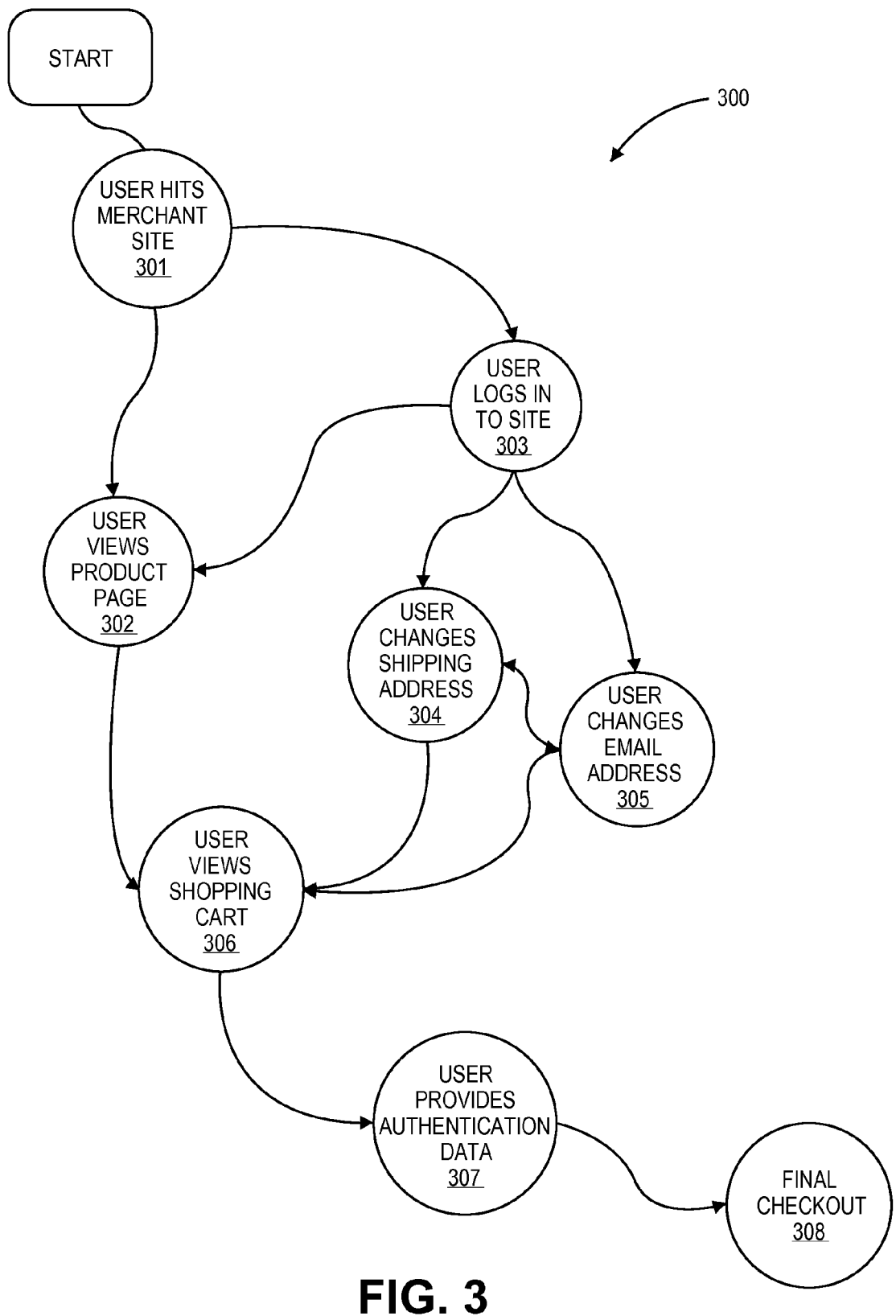
FIG. 3 illustrates a sequence diagram of interactions by a user with a merchant system according to an embodiment of the invention.

FIG. 3 illustrates an exemplary sequence diagram 300 of interactions by a user with a merchant system according to an embodiment of the invention. The interactions depicted in the sequence diagram 300 are merely exemplary. Alternative examples may include additional interaction points, fewer interactions points, and/or different interactions points.

Interaction 301 may occur when the user hits a merchant site. For example, the user may select a hyperlink directing an internet browser to the merchant site, or may enter a URL for the merchant site into an address bar on an internet browser. The user may access the merchant site using an internet-enabled device, such as a desktop computer, laptop computer, tablet computer, or mobile phone. In some embodiments, each interaction point may have a different risk level that varies such that some interaction points have a higher risk level, while other interaction points have a lower risk level.

Interaction 302 may occur when the user selects and views a product page on the merchant site. Interaction 302 may alternatively occur when the user adds the product to their shopping cart. In other embodiments, interaction 302 may occur when the user views specific content on the merchant website, such as an article.

Interaction 303 may occur when the user logs into the merchant site. For example, the user may provide a user name and password (or other credentials) as authentication data. In typical merchant sites, the user must provide authentication data in order to access and make any modifications to an account. A screen shot of an exemplary user login page according to an embodiment of the invention is depicted in FIG. 7. In some embodiments, interaction 303 may occur when the user is merely viewing the user login page. In other embodiments, interaction 303 may occur when the user selects the "Sign in using our secure server" button as depicted in FIG. 7, or an equivalent option.

Interaction 304 may occur when the user changes a shipping address associated with the account. Once the user has logged into the account with the merchant site, the user may modify the personal settings associated with the account, including the shipping address. A screen shot of an exemplary change shipping address page according to an embodiment of the invention is depicted in FIG. 8. In some embodiments, interaction 304 may occur when the user is merely viewing the change shipping address page. In other embodiments, interaction 304 may occur when the user selects the "Continue" button as depicted in FIG. 8, or an equivalent option.

Interaction 305 may occur when the user changes an email address associated with the user account. Once the user has logged into the user account with the merchant site, the user may modify the personal settings associated with the user account, including the email address.

Modifying the shipping address or the email address associated with the user account are just two examples of personal settings associated with the user account that may be modified. Additional modifications may include, but are not limited to, changing billing address, payment method, notification settings, account name, and account password.

Figure 9:
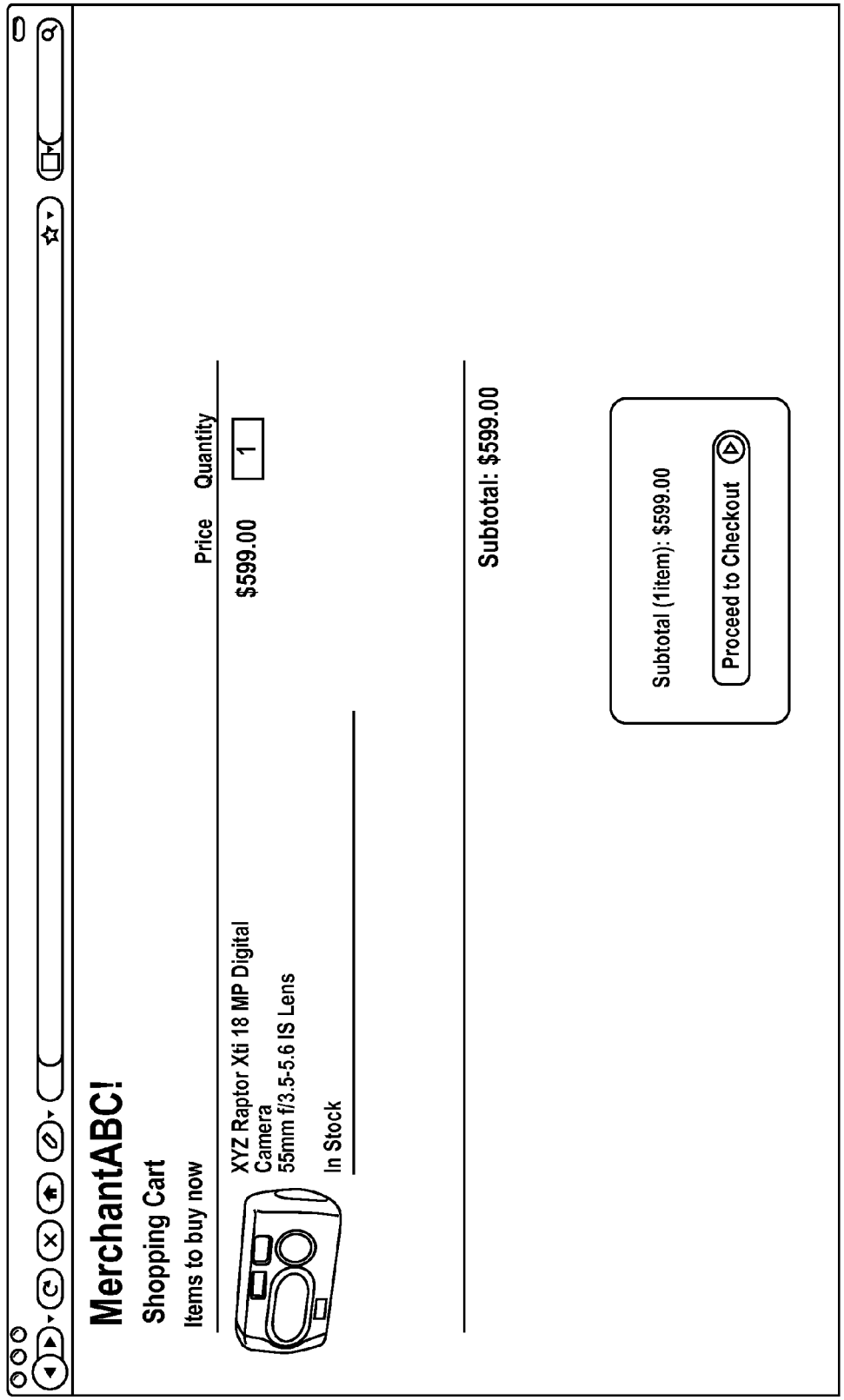
FIG. 9 shows a screen shot of an exemplary shopping cart page according to an embodiment of the invention.

Interaction 306 may occur when the user views a shopping cart page on the merchant site. Typically, the shopping cart page indicates (either textually or graphically) products selected for purchase by the user and an estimate of the purchase total for a transaction including all the products selected for purchase contained in the shopping cart. A screen shot of an exemplary shopping cart page according to an embodiment of the invention is depicted in FIG. 9. In some embodiments, interaction 306 may occur when the user is merely viewing the shopping cart page. In other embodiments, interaction 306 may occur when the user selects the "Proceed to Checkout" button as depicted in FIG. 9, or an equivalent option.

Interaction 307 may occur when the user provides authentication data to the merchant site. Typically, when a user has completed selecting items to be purchased, the user must provide authentication data in order to proceed with the purchase transaction. In some embodiments, the user must enter the authentication data to proceed with the purchase transaction even if the user has previously logged into the site. This can reduce the risk of fraudulent activity when an account holder inadvertently leaves their account logged into a merchant site and another individual attempts to conduct a transaction.

Interaction 308 may occur when the final checkout process is carried out. This interaction point may occur when the user attempts to submit an order to complete a financial transaction. For example, this may occur when the user selects a "Submit", "Complete Order", or a similar option on a transaction checkout page. A screen shot of an exemplary order checkout page according to an embodiment of the invention is depicted in FIG. 10. After evaluating the details of the order checkout page in FIG. 10, the user may select the button labeled, "Place your order," in order to submit the order for processing and fulfillment. In some embodiments, interaction 308 may occur once the user selects the button labeled, "Place your order". In other embodiments, interaction 308 may occur when the user is merely viewing the order checkout page, and before the user submits the order for processing.

Figure 4:
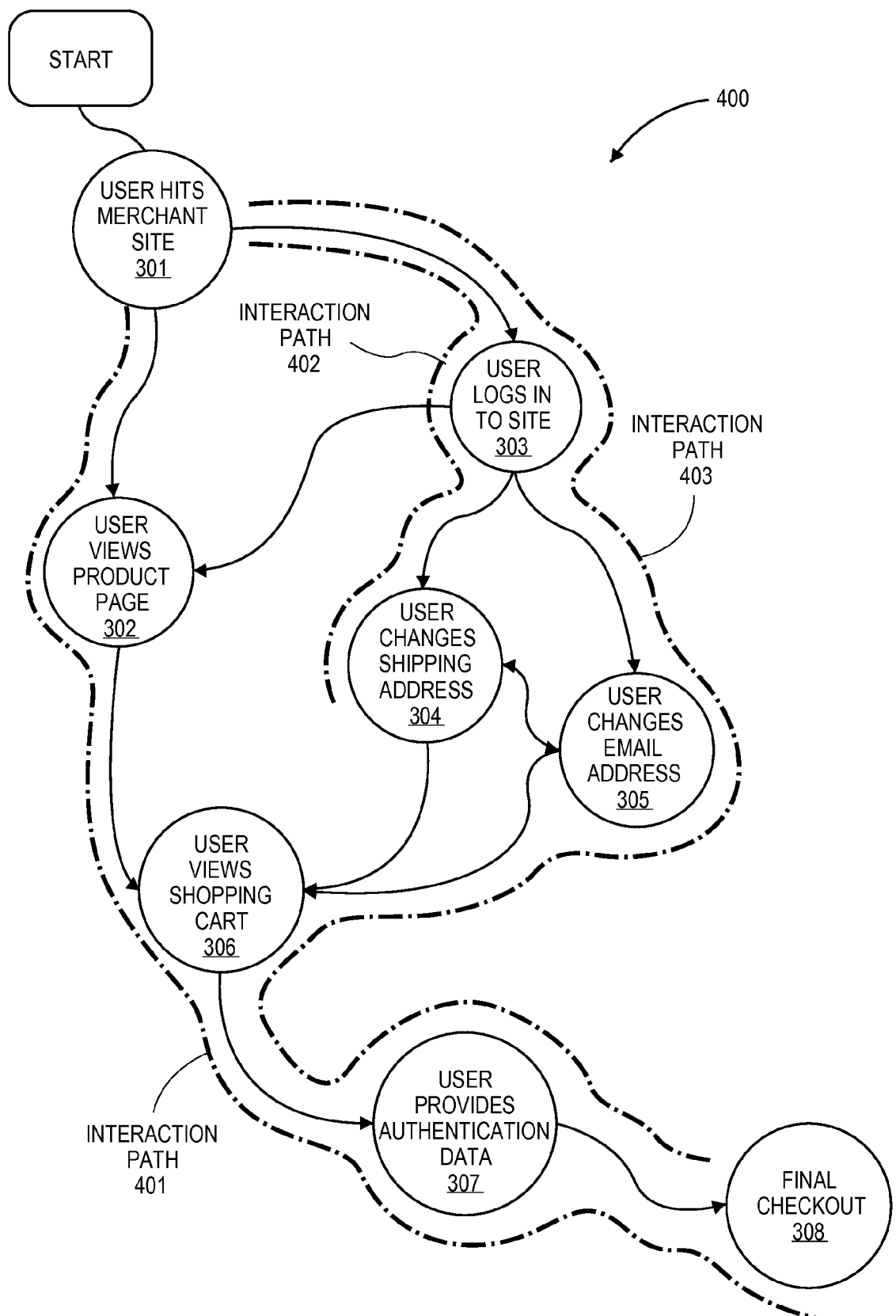
FIG. 4 illustrates a sequence diagram of interactions by a user with a merchant system depicting exemplary interaction paths according to an embodiment of the invention.

FIG. 4 illustrates an exemplary sequence diagram 400 including exemplary interaction paths that may be conducted by a user.

Interaction path 401 depicts an exemplary series of interactions conducted by the user. In interaction path 401, the user hits the merchant site (301), the user views a product page (302), the user views the shopping cart (306), the user provides authentication data (307), and the user conducts a final checkout to complete a transaction (308).

In interaction path 402, the user hits the merchant site (301), the user logins into a user account with the merchant site (303), and the user changes a shipping address associated with the user account (304).

In interaction path 403, the user hits the merchant site (301), the user logins into a user account with the merchant site (303), the user changes an email address associated with the user account (305), the user views the shopping cart (306), the user provides authentication data (307), and the user conducts a final checkout to complete a transaction (308).

At each of the interaction points in each of the interactions paths, the merchant system can send out a data message to the dynamic network analytics system including a query. The query may be a request for a risk assessment of the user and the interaction being conducted by the user. In some embodiments, each of the interaction paths 401-403 may be evaluated with each other to determine the risk associated with a current interaction path. For example, interaction path 403 occurring after interaction path 402 may be given a higher risk level than if interaction path 403 occurred with following interaction path 402. However, in other embodiments, each of the interactions paths 401-403 may be viewed independently of each other.

Figure 5:
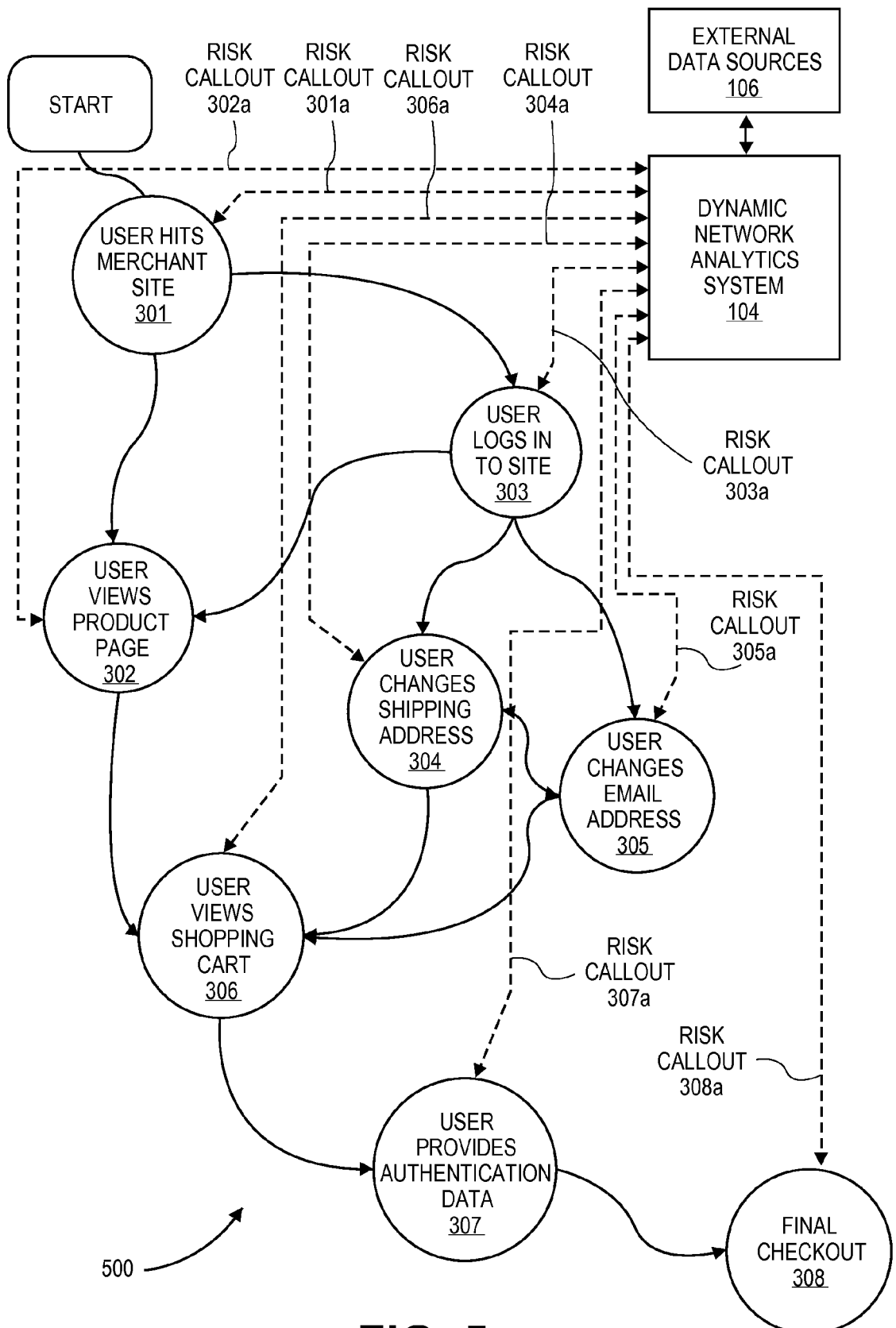
FIG. 5 illustrates a sequence diagram of interactions by a user with a merchant system depicting exemplary risk callout paths according to an embodiment of the invention.

FIG. 5 illustrates an exemplary sequence diagram 500 depicting risk callouts 301a-308a that may sent by a merchant system corresponding to interactions 301-308. The risk callouts may be sent by the merchant system when the user conducts any of the interactions 301-308, as described previously with respect to FIG. 3.

For example, at interaction 303, the user logs in to the merchant site using authentication data (e.g. user name and password. The merchant system may send a data message including a query through a risk callout 303a that is sent from the merchant system to the dynamic network analytics system 104. The dynamic network analytics system 104 may retrieve external data from one or more external data sources 106, generate a response to the query, and send the response back to the merchant system. A similar scenario may be conducted for interactions 301, 302, 304, 305, 306, 307, and 308, via risk callouts 301a, 302a, 304a, 305a, 306a, 307a, and 308a, respectively.

Figure 6:
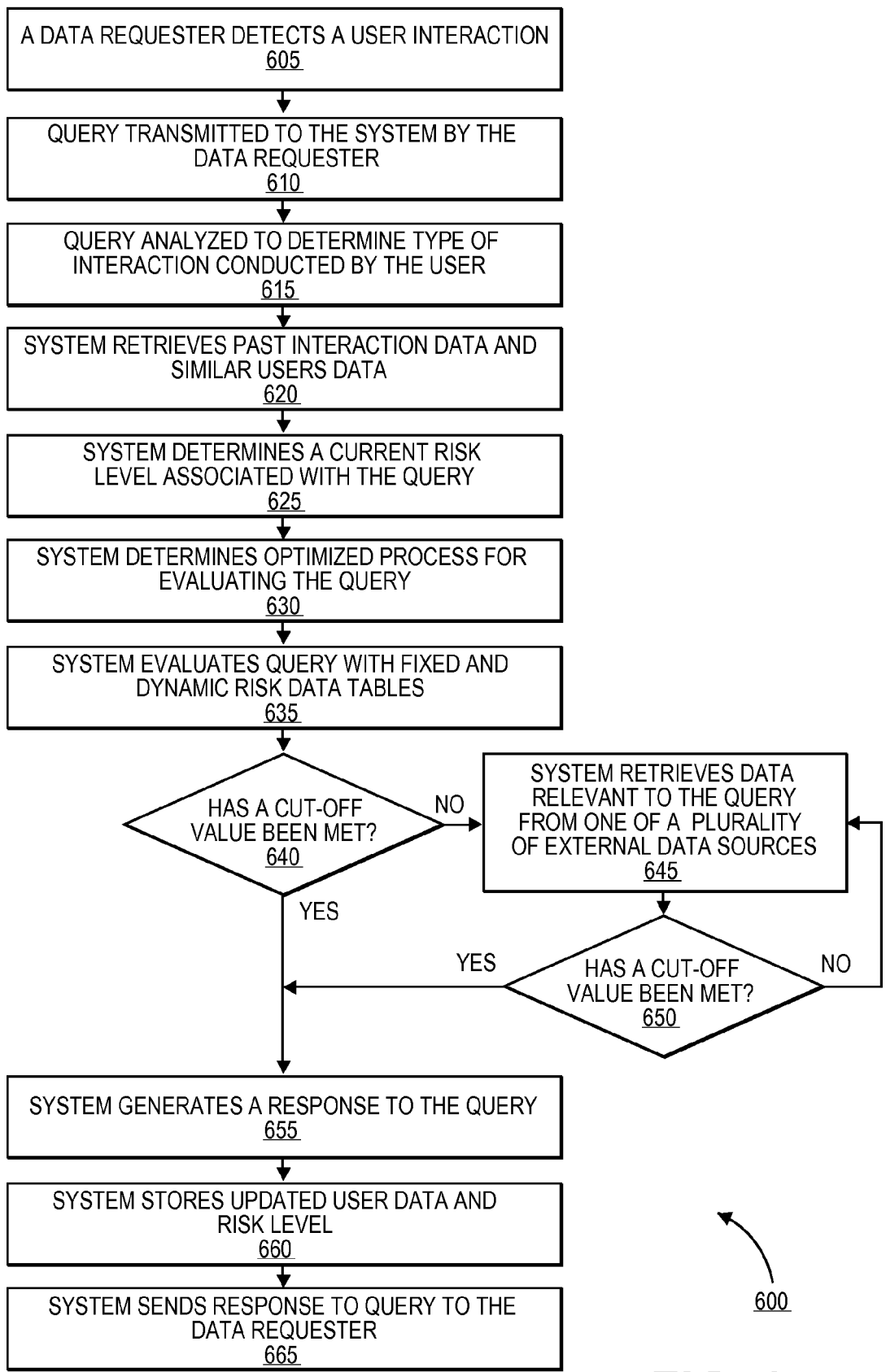
FIG. 6 illustrates a flowchart describing a procedure for processing and responding to a data message received from a data requester according to an embodiment of the invention.

FIG. 6 is a flowchart of a method 600 for receiving a query from one of a plurality of data requesters 102, evaluating the query, and determining a response to the query based on an analysis of risk data and external data, through the system 100 shown in FIG. 1.

In step 605, a data requester 102 detects an interaction by a user. In embodiments, the interaction may be the user connecting to a data requester system, such as a merchant website. Other examples of interactions include, but are not limited to, modifying account settings (e.g., email address, billing address, shipping address, notification settings, etc.), viewing products or content, selecting products for purchase, requesting data, and conducting a financial transaction through the data requester system.

In step 610, a query is transmitted to the dynamic network analytics system 104 by the data requester 102. In some embodiments, the query is based on the interaction by the user with the data requester 102 and comprises at least one of device data, consumer data, interaction data, and transaction data. In some embodiments, the query is transmitted to a web server 104*a* in the dynamic network analytics system 104. In some embodiments, the query is in the form of a request by the data requester 102 as to whether the user is an authentic user or an illegitimate user that may attempt to conduct fraudulent actions. In some embodiments, the query is sent in a data message in an HTML post message format. In other embodiments, the query is sent by any other appropriate messaging and communications means.

In step 615, the query is analyzed to determine the type of interaction conducted by the user. When the dynamic network analytics system 104 receives the data message, the web server 104*a* cleans the data message of any viruses and validates whether the query in the data message is an appropriate query. After being validated and analyzed by the web server 104*a*, the data message is sent to the data analyzer module 104*c*. The data analyzer module 104*c* analyzes the query in the data message. In some embodiments, part of the analysis of the query is a determination of the type of interaction detected by the data requester and for which the query was sent.

In step 620, the dynamic network analytics system 104 retrieves past interaction data and similar users data to the user. The data analyzer module 104*c* may access a log file 104*b* in order to retrieve stored past interaction data of the user and similar users data, which may include past interactions be similar users and risk levels for the interaction based on similar users. The data analyzer module 104*c* may retrieve past interaction data for the user with the merchant system.

For example, the data analyzer module 104*c* may retrieve all the interactions conducted by the user over a specific time period to determine whether there is recent indication of fraud. In other embodiments, the data analyzer module 104*c* may retrieve all the interactions conducted by the user that are of the same type as the type of interaction detected by the data requester 102. This data may be analyzed and used to detect patterns in the user's interactions (e.g., the user regularly submits a financial transaction for processing every Friday).

The data analyzer module 104*c* may also retrieve similar users data corresponding to the same type of interaction detected by the data requester 102. In other embodiments, the data analyzer module 104*c* may retrieve similar users data that includes all interactions conducted by similar users.

In step 625, the dynamic network analytics system 104 determines a current risk level associated with the query. In some embodiments, based on the stored past interaction data and similar users data, data analyzer module 104*c* may determine the current risk level associated with the interaction. The current risk level may be based on an analysis of all the retrieved data.

For example, there may be a low risk for the interaction if there have been no previous problems with the IP address used, no suspicious behavior by the particular user in the retrieved previous interactions, and/or there is a low risk in behavior based on similar user. On the other hand, there may be a high risk if there has been fraudulent activity on that the IP address used, suspicious behavior by that particular user such as changed email/shipping address in previous interactions or if the current interaction is for a transaction of higher value than is typical, and/or there is a high risk in the interaction based on similar users.

In step 630, the dynamic network analytics system 104 determines an optimized process for evaluating the query. The current risk level may be based solely on past data and additional data may be required to determine a more reliable or accurate risk level for the interaction. In some embodiments, the optimized process is determined by the data analyzer module 104*c* based on weighing multiple factors, including retrieved stored external sources data. Examples of these factors include the cost of querying each of the external data sources, the time to query and receive a response from each of the external data sources, and the current risk level. In some embodiments, determining the process for querying a plurality of external data sources may include evaluating the stored external sources data with the current risk level associated with the interaction conducted by the consumer with the data requester system, and determining a selection of the plurality of external data sources to retrieve data from related to the query For example, given example External Sources A-F, the data analyzer module 104*c* may determine different optimized processed based on different risk levels. The optimized processes may weigh the factors described above and present a selection of the external data sources 106. In some embodiments, the selection of the external data sources 106 may provide an order for the selection to be queried. If the risk level is high, the data analyzer module 104*c* might determine the optimized process for evaluating the query to be to first check the fixed risk data tables 104*e*-1 and dynamic risk data tables 104*e*-2 and then go to External Sources A, C, D, B, F, and E, one at a time until the data analyzer module 104*c* has gathered enough information to respond to the query. If the risk level is low, the data analyzer module 104*c* might determine the optimized process for evaluating the query to be to first check the fixed risk data tables 104*e*-1 and dynamic risk data tables 104*e*-2, and then go to External Source F and E, one at a time. In this scenario, External Sources A-D may be skipped if the data analyzer module 104*c* determines that they are too expensive and not worth the expense given the relatively low risk.

In step 635, the dynamic network analytics system 104 evaluates the query with the fixed risk tables 104*e*-1 and the dynamic risk tables 104*e*-2. In some embodiments, data relevant to the query is retrieved from the fixed risk tables 104*e*-1 and the dynamic risk tables 104*e*-2 and may include external data matching the device data, transaction data, user data and/or interaction data in the query. The data analyzer module 104*c* may evaluate the query with the fixed risk data tables 104*e*-1 and the dynamic risk data tables 104*e*-2. In some embodiments, the data for the fixed risk data tables 104*e*-1 and the dynamic risk data tables 104*e*-2 may be transmitted to the dynamic network analytics system 104 by an external risk analyzer 110 via a second communications channel 2.

In step 640, the dynamic network analytics system 104 determines whether a cut-off value has been met. In some embodiments, the cut-off values may be time-based, cost-based or accuracy-based.

When the data analyzer module 104c determines that one or more of the cut-off values have been met, the data analyzer module 104c may stop querying the fixed risk data tables 104e-1 and the dynamic risk data tables 104e-2. The data analyzer module 104c may then generate a response to the query.

When the data analyzer module 104c determines that none of the cut-off values have been met, the process continues to step 645 and retrieves external data from one of the external data sources 106 based on the previously determined selection of the external data sources.

In step 645, the dynamic network analytics system 104 retrieves data relevant to the query from one of a plurality of external data sources 106. In some embodiments, data relevant to the query may include external data matching the device data, transaction data, user data and/or interaction data in the query. In some embodiments, the data analyzer module 104c may send a query to one of the external data sources 106 via an external data communication channel 3. The query is received by a central data interface 108 that then transmits the query to the appropriate one of the external data sources 106. Once the external data source 106 has completed its analysis based on the query from the data analyzer module 104c, the external data source 106 transmits the requested data back to the data analyzer module 104c through the central data interface 108 via the external data communication channel 3.

In step 650, the dynamic network analytics system 104 determines whether a cut-off value has been met. In some embodiments, the cut-off values may be time-based, cost-based or accuracy-based.

When the data analyzer module 104c determines that one or more of the cut-off values have been met, the data analyzer module 104c may stop querying external data sources and proceed to generate a response to the query.

When the data analyzer module 104c determines that none of the cut-off values have been met, the process returns to step 645 and retrieves external data from the next external data source from the selection of the external data sources.

In step 655, the dynamic network analytics system 104 generates a response to the query. In some embodiments, the response to the query is generated by the data analyzer module 104c and may contain a risk assessment of the interaction included in the query and/or a risk score indicating the risk level of the interaction.

In step 660, the dynamic network analytics system 104 stores the updated user data and the risk level. Once the data analyzer module 104c has generated the response to the query, the dynamic network analytics system 104 may store the updated user data and the determined risk assessment to the log file 104b. In some embodiments, by updating the data stored in the log file 104b, the risk assessment conducted for the interaction that was the subject of the query can be used in the risk evaluation of any following interactions. In these embodiments, as the dynamic network analytics system 104 evaluates the risk of additional interactions by the user and by similar users, the risk evaluation conducted by the dynamic network analytics system 104 may produce results with greater reliability as each successive risk evaluation is based on a greater store of previous interactions. In some embodiments, the data analyzer module 104c updates the stored consumer data with the current interaction data, and updates the stored similar consumers data with the current risk level associated with the interaction conducted by the consumer with the data requester 102.

In step 665, the dynamic network analytics system 104 sends the response to the query back to the data requester. Once the data analyzer module 104c has generated the response to the query, the dynamic network analytics system 104 may transmit the response to the query to the data requester 102. In some embodiments, the response to the query is sent in a data message in an HTML post message format. In other embodiments, the response to the query is sent by any other appropriate messaging and communications means.

III. Technical Benefits

Embodiments of the invention provide the technical benefits of efficiency and conserving resources. As the risk evaluation conducted by dynamic network analytics system is performed in an iterative or escalating manner (e.g., one external data source is queried for data at a time), both system resources and financial resources may be conserved. In the previous solutions, the risk evaluation would be accomplished by querying a plurality of external data sources, receiving data from the plurality of external data sources, aggregating the data, analyzing the data, and then generating a response. Since retrieving data from external data sources requires the expenditure of financial resources, retrieving the data from the plurality of external data sources becomes costly and inefficient. Embodiments of the invention, on the other hand, determine what type of interaction the query from the data requester is in regards to, determine a current level of risk for the type of interaction contained in the query, weigh the current level of risk against past interactions conducted by the user and by similar users to the user, and then determine an optimized process for querying and retrieving data from external data sources.

This optimized process allows for the system to determine, prior to querying external data sources, which of the plurality of external data may be best suited to provide the data to generate a response to the query, factoring in time to query, cost to query, and accuracy or reliability of each of the plurality of external data sources.

An additional benefits of embodiments of the invention is a reduction in the number of fraudulent transactions being authorized and processed, and the ability to prevent fraudulent transactions by recognizing interactions that may be indicative of fraud. By reducing the amount of fraudulent activity, system resources that would be used to deal with fraudulent activities (e.g., monitoring, chargebacks, processing fraudulent transaction, etc.) may be correspondingly reduced.

IV. Additional Embodiments

An additional embodiment of the invention is directed to a method comprising providing a website having a product page and a shopping checkout page, determining that a customer is viewing the product page, and determining a first risk level estimate concerning the consumer when the customer is viewing the product page. The method may further comprise determining that the customer is viewing the shopping checkout page, updating the first risk level estimate to a second risk level estimate concerning the consumer when the customer is viewing the shopping checkout page, receiving an indication to start a purchase transaction from the consumer on the shopping checkout page, and assessing a risk of the purchase transaction using the second risk level estimate that was updated from the first risk level estimate.

Additional embodiments of the invention are directed to the method, wherein viewing the product page is a first interaction.

Additional embodiments of the invention are directed to the method, wherein viewing the shopping checkout page is a second interaction.

Additional embodiments of the invention are directed to the method, wherein the first risk level estimate is determined based off past interactions by the user, past interactions by similar users to the user, and a baseline risk level for viewing the product page.

Additional embodiments of the invention are directed to the method, wherein the second risk level estimate is determined based off past interactions by the user, past interactions by similar users to the user, and a baseline risk level for viewing the shopping checkout page, and wherein the past interactions by the user includes at least the first interaction and the first risk level estimate.

Additional embodiments of the invention are directed to the method, wherein assessing the risk of the purchase transaction using the second risk level estimate that was updated from the first risk level estimate, further comprises, querying stored data sources and external data sources for risk data, analyzing the risk data to generate a risk assessment, and providing the risk assessment indicating the risk level of the purchase transaction.

In an additional embodiment, a system electronically receives a query in the form of an HTML post message from a data requester. In embodiments, the query is regarding a financial transaction, and is being asked in order to assist the data requester to determine whether the financial transaction should be approved or declined. The query in the HTML post message is evaluated against risk data tables by a data analyzer. If there is insufficient information to make a determination (e.g. a defined threshold for acceptable risk is not met), the data analyzer obtains additional information from external data sources. The external data sources are evaluated in an escalating manner, such that when the data from the first external data source is insufficient for the transaction analyzer, a second external data source is contacted for additional data, and so on, until the data analyzer can generate a risk score in response to the query obtained from the data requester. Once the transaction analyzer has sufficient data to form a risk score for the financial transaction, the risk score is electronically sent back to the data requester that initially sent the HTML post message.

V. Exemplary Apparatuses

Figure 11:
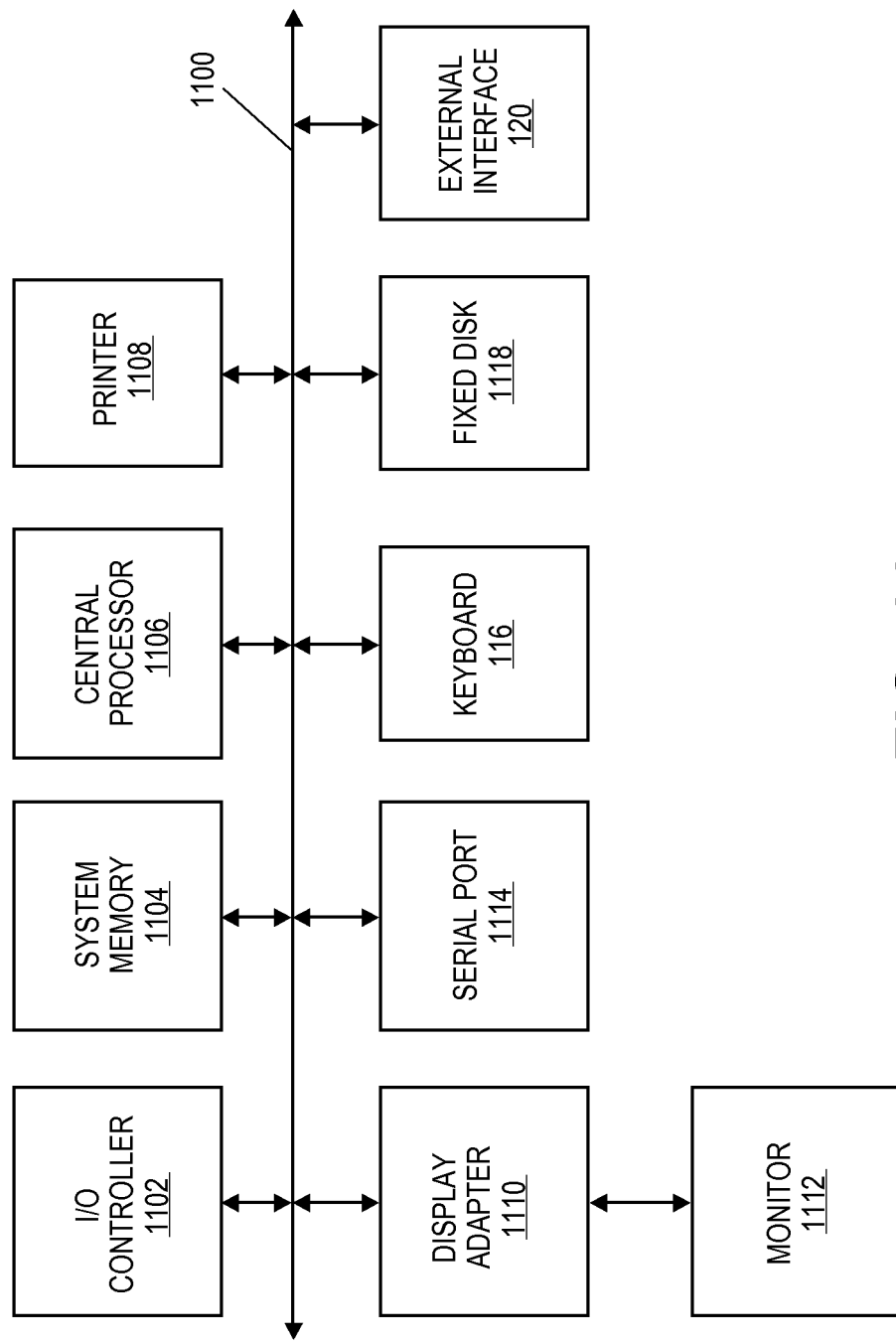
FIG. 11 shows a block diagram of a computer apparatus according to an embodiment of the invention.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 11. The subsystems shown in FIG. 11 are interconnected via a system bus 1100. Additional subsystems such as a printer 1108, keyboard 1116, fixed disk 1118 (or other memory comprising computer readable media), monitor 1112, which is coupled to display adapter 1110, and others are shown. Peripherals and input/output (I/O) devices, which couple to I/O controller 1102, can be connected to the computer system by any number of means known in the art, such as serial port 1114. For example, serial port 1114 or external interface 1120 can be used to connect the computer apparatus to a wide area network such as the Internet, a mouse input device, or a scanner. The interconnection via system bus 1100 allows the central processor 1106 to communicate with each subsystem and to control the execution of instructions from system memory 1104 or the fixed disk 1118, as well as the exchange of information between subsystems. The system memory 1104 and/or the fixed disk 1118 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In some embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for iteratively retrieving data relevant to a query, comprising:

receiving, by a data analyzer module, a first data message including the query from a data requester;

determining, by the data analyzer module, a current risk level associated with the query;

retrieving, by the data analyzer module, risk data relevant to the query from one or more fixed risk data tables and one or more dynamic risk data tables;

determining, by the data analyzer module, that the risk data is not a sufficient amount of data to form a response to the query based on the current risk level by determining that one or more cut-off values have not been reached;

retrieving, by the data analyzer module, first external data relevant to the query from a first external data source in response to the determination that the risk data is not a sufficient amount of data to form the response;

determining, by the data analyzer module, that the risk data and the first external data are not a sufficient amount of data to form the response to the query based on the current risk level by determining that the one or more cut-off values have not been reached;

retrieving, by the data analyzer module, additional external data relevant to the query from one or more additional external data sources until the data analyzer module determines that the risk data, the first external data, and the additional external data are a sufficient amount data to form the response to the query based on the current risk level by determining that the one or more cut-off values have been reached;

determining, by the data analyzer module, that the risk data, the first external data, and the additional external data are a sufficient amount of data to form the response to the query based on the current risk level by determining that the one or more cut-off values have been reached;

generating, by the data analyzer module, a second data message containing the response to the query; and providing, by the data analyzer module, the second data message to the data requester.

2. The method of claim 1 wherein the query is based on an interaction by a user with the data requester and comprises at least one of device data, consumer data, interaction data, and transaction data.

3. The method of claim 1 wherein determining whether there is sufficient data to form the response to the query is based on a balancing of the current risk level, a cost of querying each of the plurality of external data sources, and a time to query each of the plurality of external data sources.

4. The method of claim 1 further comprising:
evaluating, by the data analyzer module, interaction history related to the query.

5. The method of claim 1 wherein the response to the query comprises a risk assessment for the query.

6. The method of claim 1 wherein the response to the query is based on the data received from one or more of the one or more fixed risk data tables, one or more dynamic risk data tables, and the external data sources.

7. The method of claim 1 wherein the one or more cut-off values are time-based, cost-based or accuracy-based.

8. The method of claim 1 wherein the response to the query comprises an authentication assessment of a user interacting with the data requester.

9. The method of claim 1 wherein the data requester is a merchant, and wherein the query is for a transaction between a user and the merchant, and wherein the response to the query includes an indication approving or rejecting the transaction.

10. The method of claim 1 wherein the fixed risk tables are updated daily with data from an external risk analyzer, and wherein the dynamic risk data tables are updated in real-time.

11. The method of claim 1 wherein the one or more cut-off values include at least one of a first value indicating a length of time threshold for providing the second data message to the data requester, a second value indicating a cost threshold for retrieving the first external data and the additional external data, or a third value indicating an accuracy of the response.

12. A method comprising:
receiving, by a data analyzer module, a first data message including a query from a data requester;

parsing, by the data analyzer module, the query to determine current interaction data for an interaction conducted by the consumer with the data requester system;

retrieving, by the data analyzer module, stored consumer data, wherein the stored consumer data comprises past interaction data of the consumer with the data requester system;

retrieving, by the data analyzer module, stored similar consumers data, wherein the stored similar consumers data comprises risk levels for the interaction for similar consumers to the consumer;

retrieving, by the data analyzer module, stored external sources data;

determining, by the data analyzer module, based on the stored consumer data, the stored similar consumers data, and the stored external sources data, a current risk level associated with the interaction conducted by the consumer with the data requester system;

determining, by the data analyzer module, a process for querying a plurality of external data sources based on the current risk level, the process including selection of two or more external data sources of the plurality of external data sources and specifying an order for querying the selected two or more external data sources, the plurality of external data sources each being located in different locations from each other;

querying, by the data analyzer module, the selected two or more external data sources in the order specified by the process to generate a response to the query;

generating, by the data analyzer module, a second data message containing the response to the query; and providing, by the data analyzer module, the second data message to the data requester.

13. The method of claim 12 wherein determining the process for querying a plurality of external data sources comprises:
evaluating the stored external sources data with the current risk level associated with the interaction conducted by the consumer with the data requester system.

14. The method of claim 13 wherein the stored external sources data is comprised of at least a cost of querying each one of the plurality of external data sources, a time required to receive a response from each one of the plurality of external data sources, and a reliability score for each one of the plurality of external data sources.

15. The method of claim 14 further comprising:
updating the stored consumer data with the current interaction data; and
updating the stored similar consumers data with the current risk level associated with the interaction conducted by the consumer with the data requester system.

16. The method of claim 15 wherein the query is a first query, wherein the current interaction data is first current interaction data, wherein the interaction is a first interaction, wherein the current risk level is a first current risk level, wherein the process is a first process, and wherein the method further comprises:
receiving, by the data analyzer module, a second data message including a second query from a data requester;
parsing, by the data analyzer module, the second query to determine second current interaction data for a second interaction conducted by the consumer with the data requester system;

retrieving, by the data analyzer module, the updated stored consumer data, wherein the updated stored consumer data comprises past interaction data of the consumer with the data requester system, including the first current interaction data;

retrieving, by the data analyzer module, the updated stored similar consumers data, wherein the updated stored similar consumers data comprises risk levels for the interaction for similar consumers to the consumer;

retrieving, by the data analyzer module, the stored external sources data;

determining, by the data analyzer module, based on the updated stored consumer data, the updated stored similar consumers data, and the stored external sources data, a second current risk level associated with the second interaction conducted by the consumer with the data requester system; and determining, by the data analyzer module, a second process for querying the plurality of external data sources, wherein the second process is different from the first process.

17. The method of claim 12 further comprising:
performing, by the data analyzer module, the process for querying the plurality of external data sources.

18. The method of claim 12 wherein the past interaction data is retrieved based on one or more of a specific time period and the type of interaction detected.

19. The method of claim 12 wherein the stored external sources data includes a fixed risk data table and a dynamic risk data table.

20. A computer comprising:
a processor; and
a computer readable medium coupled to the processor, the computer readable medium comprising code, executable by the processor for implementing the method of claim 12.

21. A computer comprising:
a processor; and
a computer readable medium coupled to the processor, the computer readable medium comprising code, executable by the processor for implementing a method for iteratively retrieving data relevant to a query comprising:

receiving a first data message including the query from a data requester;

determining a current risk level associated with the query;

retrieving risk data relevant to the query from one or more fixed risk data tables and one or more dynamic risk data tables;

determining that the risk data is not a sufficient amount of data to form a response to the query based on the current risk level by determining that one or more cut-off values have not been reached;

receiving first external data relevant to the query from a first external data source in response to the determination that the risk data is not a sufficient amount of data to form the response;

determining that the risk data and the first external data are not a sufficient amount of data to form the response to the query based on the current risk level by determining that the one or more cut-off values have not been reached;

retrieving additional external data relevant to the query from one or more additional external data sources until the processor determines that the risk data, the first external data, and the additional external data are a sufficient amount of data to form the response to the query based on the current risk level by determining that the one or more cut-off values have been reached;

determining that the risk data, the first external data, and the additional external data are a sufficient amount of data to form the response to the query based on the current risk level by determining that the one or more cut-off values have been reached;

generating a second data message containing the response to the query; and providing the second data message to the data requester.

* * * * *